United States Patent
Hassan et al.

(10) Patent No.: US 11,599,814 B2
(45) Date of Patent: Mar. 7, 2023

(54) AUTOMATED EXCEPTION FEATURIZATION AND SEARCH

(71) Applicant: Microsoft Technology Licensing, LLC, Redmond, WA (US)

(72) Inventors: Foyzul Hassan, San Antonio, TX (US); Chetan Bansal, Seattle, WA (US); Thomas Michael Josef Zimmermann, Bellevue, WA (US); Nachiappan Nagappan, Bellevue, WA (US); Ahmed Awadallah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 658 days.

(21) Appl. No.: 16/659,174

(22) Filed: Oct. 21, 2019

(65) Prior Publication Data
US 2021/0117838 A1     Apr. 22, 2021

(51) Int. Cl.
| | | |
|---|---|---|
| G06F 16/9532 | (2019.01) | |
| G06N 20/00 | (2019.01) | |
| G06F 8/41 | (2018.01) | |
| G06N 7/00 | (2006.01) | |

(52) U.S. Cl.
CPC ......... *G06N 7/005* (2013.01); *G06F 16/9532* (2019.01); *G06N 20/00* (2019.01); *G06F 8/41* (2013.01)

(58) Field of Classification Search
CPC .... G06N 7/005; G06N 20/00; G06F 16/9532; G06F 8/41
See application file for complete search history.

(56) References Cited

U.S. PATENT DOCUMENTS

| | | | | |
|---|---|---|---|---|
| 10,175,979 | B1 * | 1/2019 | Elwell | G06F 8/71 |
| 11,232,016 | B1 * | 1/2022 | Huynh | G06N 3/0454 |
| 2008/0133488 | A1 * | 6/2008 | Bandaru | G06F 40/30 |
| | | | | 715/810 |
| 2014/0081714 | A1 * | 3/2014 | Debow | G06Q 10/06398 |
| | | | | 705/7.42 |

(Continued)

OTHER PUBLICATIONS

Yuhang Li et al. "EH-Recommender: Recommending Exception Handling Strategies Based on Program Context", [Online], p. 104-114, [Retrieved from Internet on May 17, 2022], <https://ieeexplore.ieee.org/stamp/stamp.jsp?arnumber=8595064> (Year: 2018).*

(Continued)

*Primary Examiner* — Ziaul A Chowdhury
(74) *Attorney, Agent, or Firm* — Schwegman Lundberg & Woessner, P.A.

(57) ABSTRACT

A computer implemented method includes receiving an exception generated based on programming code, generating exception features from the received exception, the generated exception features being generated based on a set exception features derived from search logs, and executing a machine learning model on the received exception and generated exception features to provide information from the search logs identified as most helpful to resolve the received exception, wherein the machine learning model was trained on training data comprising extracted exceptions and the set of exception features derived from the search logs.

18 Claims, 5 Drawing Sheets

(56) References Cited

U.S. PATENT DOCUMENTS

| | | | | |
|---|---|---|---|---|
| 2014/0129192 | A1* | 5/2014 | Blank | G07C 5/085 |
| | | | | 703/2 |
| 2019/0065179 | A1* | 2/2019 | Novak | G06F 8/71 |
| 2019/0361784 | A1* | 11/2019 | Savanur | G06K 9/6282 |
| 2020/0097389 | A1* | 3/2020 | Smith | G06F 11/3612 |

OTHER PUBLICATIONS

Anh Viet Phan et al., "Convolutional Neural Networks over Control Flow Graphs for Software Defect Prediction", [Online], pp. 45-52, [Retrieved from Internet on Nov. 5, 2022], <https://ieeexplore.ieee.org/stamp/stamp.jsp?arnumber=8371922> (Year: 2017).*

Counts, et al., "Measuring Professional Skill Development in U.S. Cities Using Internet Search Queries", In Proceedings of the International AAAI Conference on Web and Social Media, vol. 13, Issue 01, Jul. 6, 2019, 11 Pages.

Fan, et al., "Large-scale Analysis of Framework-specific Exceptions in Android Apps", In Proceedings of the 40th International Conference on Software Engineering, May 27, 2018, pp. 408-419.

Paparrizos, et al., "Detecting Devastating Diseases in Search Logs", In Proceedings of the 22nd ACM SIGKDD International Conference on Knowledge Discovery and Data Mining, Aug. 13, 2016, pp. 559-568.

Sadowski, et al., "How Developers Search for Code: a Case Study", In Proceedings of the10th Joint Meeting on Foundations of Software Engineering, Aug. 30, 2015, pp. 191-201.

Xia, et al., "What do Developers Search for on the Web?", In Journal of Empirical Software Engineering, vol. 22, Issue 6, Dec. 2017, pp. 3149-3185.

Zhang, et al., "Understanding How People use Search to Support their Everyday Creative Tasks", In Proceedings of the Conference on Human Information Interaction and Retrieval, Mar. 10, 2019, pp. 153-162.

Hassan, et al., "An Empirical Study of Software Exceptions in the Field using Search Logs", In Repository of arXiv:2006.00385v1, May 30, 2020, 13 Pages.

Kononenko, et al., "Automatically Locating Relevant Programming Help Online", In Proceedings of IEEE Symposium on Visual Languages and Human-Centric Computing (VL/HCC), Sep. 30, 2012, pp. 127-134.

"International Search Report, and Written Opinion issued in PCT Application No. PCT/US20/052986", dated Dec. 23, 2020, 12 Pages.

Sabor, et al., "An Approach for Predicting Bug Report Fields Using a Neural Network Learning Model", In Proceedings of IEEE International Symposium on Software Reliability Engineering Workshops, Oct. 15, 2018, pp. 232-236.

Tong, et al., "An Approach to Pinpointing Bug-Induced Failure In Logs of Open Cloud Platforms", In Proceedings of the 9th International Conference on Cloud Computing (Cloud), Jun. 27, 2016, pp. 294-302.

Ye, et al., "Software-specific Part-of-Speech Tagging: An Experimental Study on Stack Overflow", In Proceedings of the 31st Annual ACM Symposium on Applied Computing, Apr. 4, 2016, pp. 1378-1385.

* cited by examiner

AUTOMATED EXCEPTION FEATURIZATION AND SEARCH

BACKGROUND

Software engineers spend a substantial amount of time using Web search to accomplish software engineering tasks. Such search tasks include finding code snippets, API documentation, seeking help with debugging, etc. While debugging a bug or crash, one of the common practices of software engineers is to search for information about the associated error or exception traces on the internet. Such searches can take a significant amount of time and require the developer to sift through results that may or may not be relevant to find the most helpful information to resolve the error or exception.

SUMMARY

A computer implemented method includes receiving an exception generated based on programming code, generating exception features from the received exception, the generated exception features being generated based on a set exception features derived from search logs, and executing a machine learning model on the received exception and generated exception features to provide information from the search logs identified as most helpful to resolve the received exception, wherein the machine learning model was trained on training data comprising extracted exceptions and the set of exception features derived from the search logs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Existing developer tools fail to provide information and pointers which can be used by developers for resolving errors and exceptions in their code. An error or exception is an event that occurs during the execution, compiling, or interpretation of a computer program that disrupts the normal flow of instructions during the execution of a program. Exceptions may also include build output or stack traces in some embodiments. In other words, exceptions include information, such as errors, that can assist a programmer in debugging or otherwise improving a program. In various embodiments of the present inventive subject matter, web search and AI are leveraged to automatically mine web search data and make recommendations which can be embedded along with the errors/exceptions and help developers fix issues with code, leading to improvement in developer tools as well as developer productivity. Unlike exiting tools, predictive analytics may be generated using web search data regarding the success probability and effort required for resolving errors and exceptions.

In various embodiments, methods and techniques automatically identify and tag errors and exceptions in the output generated by software systems like compilers, IDEs, build systems, etc. The success, difficulty, and effort required to resolve an exception or error may be predicted. Incident and error reports may be automatically augmented based on the predictions to help with prioritization and effort estimation. Correct solutions for errors and exceptions may be found based on the historical web search data. Related exceptions and errors may also be found from web search data along with their solutions. The tag or tags may be used to identify the search results that likely comprise solutions or the most relevant information about the exception or error.

In one embodiment, query logs from a commercial general-purpose search engine (GPSE), also referred to herein as search logs, are analyzed to extract searches related to software exceptions. In one example, 0.98 million exception related search queries were extracted from a random sample of 5 billion queries. To extract exceptions from unstructured query text, a novel and high-performance machine learning model with a F1-score of 0.82 was used.

With the growing complexity of software systems, use of web search has become ubiquitous in software engineering. More and more software engineers are relying on search engines for various tasks, including finding code snippets, API documentation, debugging, and understanding new concepts. Software engineers depend heavily on search engines for finding information.

Researchers have proposed several approaches to improve code search. Despite all these efforts, code search often requires more effort than more general search intents to find a solution. General-purpose search engines (GPSEs) such as Google, Yahoo! and Bing are better at locating general code issues compared to specific errors or exceptions. Thus, error or exception search imposes unique challenges for developers to find solutions using GPSEs.

At least two key problems have been solved by use of the various embodiments described herein. The problems include extraction of exceptions from unstructured text and leveraging search metadata for characterization of various aspects of exception-related searches. The search metadata included popularity, effort, and success. In GPSE, search queries can be for a wide variety of intents and domains. To overcome the challenge of extracting exceptions from query logs, a new machine learning model is used for extraction of exception names and identifiers from raw query text. To train and evaluate the machine learning model, 348,559 (~0.3 million) search queries were extracted and labeled for use as training data.

The query logs contain a rich set of metadata along with associated click information. The logs may be anonymized and do not contain any personally identifiable information (PII) like IP addresses, etc. Some terms from the web search domain are used to described example embodiments:

Search Query: A search query is the raw query text entered into the search engine by a user.

Search Session: For a given client, a search session is defined as a series of search queries that extends until either the browser is closed or there is a 30-minute period of inactivity. A browser session ID may be used to identify each different session. Cookies may be used to track search session information.

Result Urls: Ordered list of Urls displayed by the search engine in response to a search query.

Clicked Urls: List of Urls clicked by the user from the Result Urls, ranked based on the order in which they were clicked.

Dwell Time: Amount of time spent by a user on the clicked result page. Dwell time is considered as one of the key metrics for web search effort and has a high correlation with task difficulty and user satisfaction.

SAT (Satisfaction) Click: Click Urls with Dwell Time more than 30 sec are considered to be SAT clicks. Prior research on search behavior. SAT Click is considered a signal for relevance of the clicked Url. A SAT Click may also be obtained by a user clicking on a question asking if the user was satisfied with the current result page.

Search Success: If the last clicked Url answered the user query, the user does not explore the search results further. A search query is considered to be successful, if the last result click for that query is a SAT Click.

Figure 1:
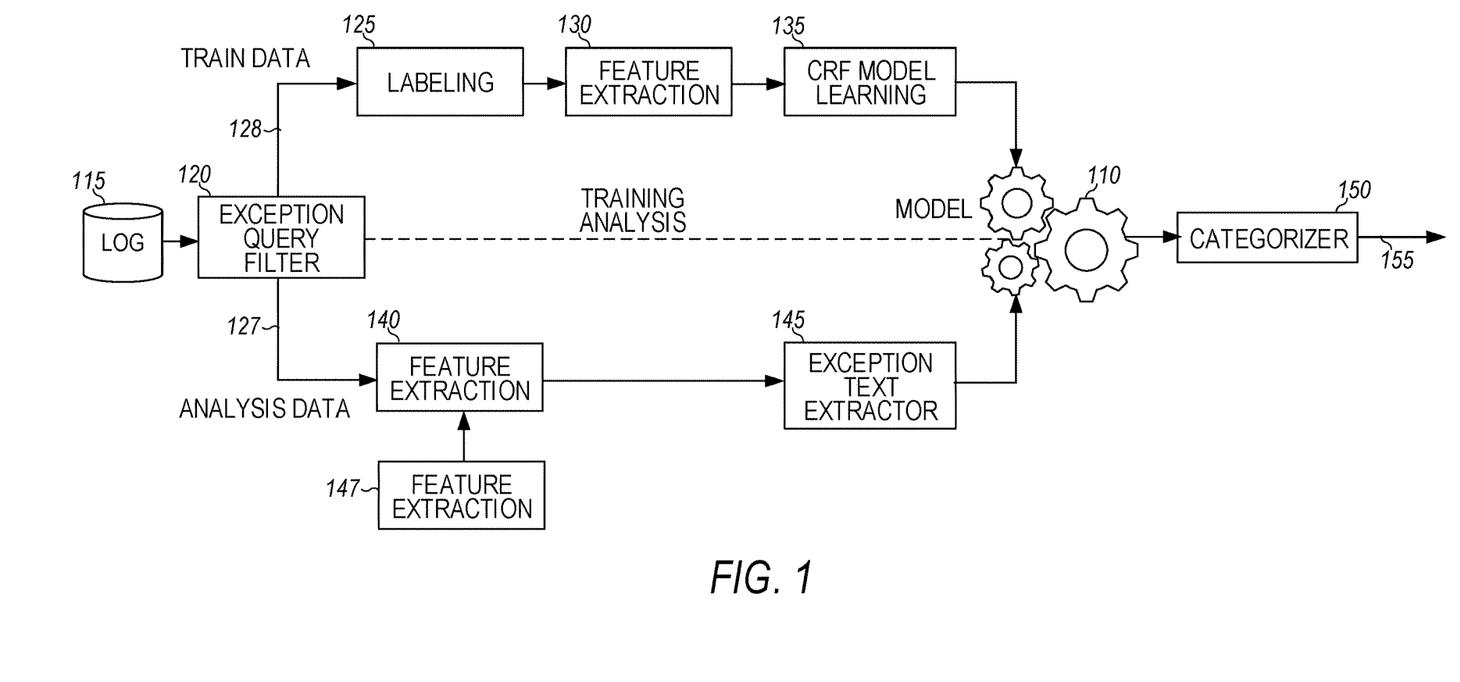
FIG. 1 is a block diagram illustrating a system for training and using a machine learning model for use in finding data relevant to programming errors and exceptions according to an example embodiment.

FIG. 1 is a block diagram illustrating a system 100 for training and using a machine learning model 110 for use in finding data relevant to programming errors and exceptions. A log 115 contains the above described search logs from a general-purpose search engine (GPSE). Web search is ubiquitous in nature and is used in different domains as well by a diverse set of people. Also, the web search patterns vary based on demographics, locales, client, etc. Since exception search behavior data from the search log 115 is desired, the following filters were applied to the data from the search log 115 to remove variation and noise:

Locale & Region: Search logs from users with English locale and the US region were used. A locale-based search request HTTP header was used to filter out searches not complying. Search queries that contain non-English characters based on character encoding were also filtered out. In further embodiments, search logs in different languages and locales may be used.

Keywords & Clicks: In order to select error and exception related queries, keyword-based filtering was also performed. For exceptions, based on manual analysis, the keywords: error, errno, and exception were used in one embodiment. All the queries which contains at least one of these keywords was extracted as useful in either the query text or the clicked Url. Further, to remove noise from the dataset, search queries which did not result in at least one click were also filtered out from consideration to help remove queries where the user did an accidental query or found the solution without using web search.

Exception data collection from search queries and exception search analysis may be performed by system 100. FIG. 1 shows an overview of the study. Based on extracted exceptions, the search behavior may be investigated to answer many different questions about exception searches, as described below. Two datasets are used in one embodiment from different time periods. The first dataset (May 15-May 30, 2019) in one example may be used to train the models to label, extract, and tag the exceptions to identify the best results. The second dataset (Jun. 1-Jul. 20, 2019) may be used for an empirical analysis of web search behavior related to exceptions.

Log 115 comprises two datasets. A first training dataset includes collected search queries from a leading commercial Web scale search engine. The training dataset may be used to train and evaluate the machine learning model 110 for extraction of exceptions from raw search query texts. Apart from this dataset, an analysis dataset may be collected from a separate set of search logs for exception search behavior analysis.

The exception filters 120 are applied to get exception related queries. In one embodiment, approximately 1.1 million search queries may be extracted along with the associated click information to be provided as training data to a labeling function 125. An example of queries from a search log is provided for illustration:

mumbai terrorist attack movie
ImportError: No module named openvino
cyberterror facts
windows 10 activation error 0xc004f050 after upgrade
key components of a exceptional employee
system.io.directorynotfoundexception in asp.net Note that first, third, and fifth queries are not related to programming exceptions and errors, but that the second, fourth, and sixth are. The latter exception related queries are selected for further processing.

For the exception search behavior analysis dataset, the filters 120 may be applied. In one example, the filters may be applied to a random sample of 5 billion search queries from a 50-day (Jun. 1, 2019 to Jul. 20, 2019) period. After filtering, 0.98 million search queries may be extracted from 589050 (0.58 million) distinct search sessions. The analysis dataset may be provided to an analysis path 127 to be described following description of the training path 128.

Search engines process search queries from a wide range of domains and intents. A mechanism is provided for extracting search queries related to exceptions. In order to be able to extract exceptions from a wide variety of programming languages (PLs) and frameworks, the extraction process should be generic. The extraction process may be started with regular search query expressions. Due to the large volume and diversity of search queries, hand-crafted regular search query expressions have low accuracy. A high-performance machine learning based approach is used to extract exception Ids and names from search queries.

For training any machine learning model, one of the main challenges is to have labeled data. For labeling function 125, a two-step process is implemented: 1) Regular expression based labeling, 2) Remove noise from the regular expression-based labels. As part of the regular expression based labeling, hand-crafted regular expressions may be used as shown in Table 1. A differentiation is made between ID based exceptions (e.g 404, CS1061) and name based exceptions (TypeError, java.io.IOException). Regular expressions no. 3 mentioned in Table 1 captures name-based exceptions, while other regular expressions capture ID based exceptions.

TABLE 1

| No | Regular expression | Sample search query |
|---|---|---|
| 1 | (error |er-rno|err|refused|errorcode|error code|hresult|exit|resonse|check code|scope|state).*(\d+) | error 2006 (hy000) at line 462 |
| 2 | (\d+).*(error|errno|err|refused| errorcode|error code|hresult|exit|response|check code|scope|state) | ssrs 2016 error: an attempt has been . . . |

TABLE 1-continued

| No | Regular expression | Sample search query |
|---|---|---|
| 3 | (?: ^|[,])[A-Za-z][1][A-Za-z.] + (error|exception|iteration) | java.lang.TypeNotPresentException: Type javax.xml.bond.JAXBContext not present |
| 4 | 0[xX][0-9a-fA-F]+ | 0x800A03EC saveas |
| 5 | [A-Z][0-9]+; | LNK1189 65535 |
| 6 | [3|4|5][0-9][0-9] | 404 GET /nbextensions/widget-s/notebook/js/extension.js |

Even though hand-crafted generic regular expressions were used to extract exceptions from search queries, as expected, it also results in significant number of false positives. For example, "Office 2016 error" is classified as an exception related query and "2016" is as the exception ID. Similarly, "cyberterror facts" query also results in a hit with "cyberterror" being tagged as the exception name.

To create the labelled training dataset for the model, labeling 125 is performed using the regular expressions training data search queries. This left approximately 0.3 million queries with exception and non-exception queries. Labels may be manually confirmed to obtain accurate training data that is semi-automatically labelled.

To parse search queries a machine learning model is used to extract an exception entity. In natural language processing, an entity is considered as basic information element and often considered the main subject of the text. named entity recognition (NER) is a natural language processing (NLP) technique used to identify entities from text and classify them into the defined categories. NER is widely used in different languages processing applications, such as newspaper content classification, Q&A systems, and machine translation, extract software project artifact information from document. NER solutions can be divided into two broad categories, rule-based and statistical pattern-based.

Rule-based methods are mainly for common entities like persons, locations, organizations, etc. using specialized dictionaries as the reference for identification. Identification of entities that are not included in the dictionary, may utilize human experts to rewrite the handcrafted rules. On the other hand, the statistical pattern-based approach needs a larger annotated corpus for learning but doesn't need human experts. Different supervised machine learning algorithms including HMMs (hidden Markov models), SVM, and conditional random fields (CRF) have been used for learning of statistical pattern-based NER systems. With a semi-automated labeling or tagging approach described above, the extracted exception entity corpus is used for NER training.

In one embodiment, a conditional random fields (CRF) algorithm previously used for segmenting and labeling sequence data is widely used for reliable sequence labeling for the NER task. In one embodiment, a first-order Markov linear chain CRF 135 is used with a forward/backward algorithm using a scaling method. Based on the Hammersley-Clifford theorem, CRF 135 computes the conditional probability of a state sequence as follows:

$$p_\theta(y \mid x) = \frac{1}{Z_\theta(x)} \exp\left\{ \sum_{t=1}^{T} \sum_{k=1}^{K} \theta_k f_k(y_{t-1}, y_t, x_t) \right\} \quad (1)$$

where x=(x1, . . . , xT) denotes the input sequence and y=(y1, . . . , yT) is the output sequence, hereafter referred to as the sequence of labels. {fk} 1≤k≤K is an arbitrary set of feature functions and {θk} 1≤k≤K are the associated real-valued parameter values.

In one embodiment CRFSuite, which is a commonly used Python library for CRF was used in CRF 135 to generated model 110. As part of feature extraction 130, tokens and parts of speech (POS) tags are the basic features to extract. The basic features have less contextual information and less text patterns. In addition to basic features, three other features may be extracted including contextual features, gazetteer features, and orthographic features. A gazetteer is a list used to find occurrences of names in text for the purpose of named entity recognition.

The resulting model 110 may be evaluated using analysis path 127 with a semi-automatic labeled dataset that was used for training the model. For example, an 80:20 random split of the training data for the training and evaluation of the machine learning model may be used. Analysis path 127 includes feature extraction 140 that operates in the same manner as feature extraction 130. Analysis path 127 also includes an exception text extractor 145 to extract text related to the exception from the queries. Note that analysis path 127 may be used in many different ways. In addition to analysis of exception queries filtered from search logs for study of different errors, the input to feature extraction 140 may be received directly from a development platform 147 or other software that generated an exception. Thus, the input may be the exception itself.

The extracted exception text from extractor 145 as well as the features from extraction 140 are provided to the model 110 for identifying the best results via categorizer 150 corresponding to the exception.

The model 110 may also be evaluated using a manually annotated dataset. For this dataset, random sampling of 500 queries with exception and non-exception queries in the ratio 1:1 collected from the training data log may be used. Researchers may have separately annotated those queries and resolved the disagreement by discussion. A Cohen's kappa coefficient may be used to find inter-rater agreement. A coefficient value of 1 indicates a complete agreement and a value of 0 indicates complete disagreement. In one example, the coefficient value was found to be 0.88, which indicates high confidence of agreement.

Since exceptions were categorized into two broad categories: i) ID-based Exception and ii) Name-based exception, the performance of both types of may be evaluated. Table 2 shows an example performance of the machine learning model for semi-automatic labeled data and manually labeled data. According to Table 2, average precision, recall and F1-Score with semi-automatic test dataset are 0.98, 0.99 and 0.99 respectively. While with manual evaluated data performance is lower than semi-automatic labeled test dataset. With a manually evaluated dataset, average precision, recall, and F1-Score are 0.83, 0.83 and 0.82 respectively. Since an example evaluation was performed with a dataset collected from real-world user search data that was large scale in nature, the performance of the model is reasonable and can be used for exception data collection for empirical analysis of exception search behavior, as well as for improving documentation to assist developers in debugging and for automatically providing search results that are most likely to be relevant to encountered exceptions.

TABLE 2

| Evaluation Type | Class | Precision | Recall | F1-Score | Support |
|---|---|---|---|---|---|
| Semi-Automatic Labeling | Exception ID | 0.98 | 0.99 | 0.99 | 69960 |
| | Exception Name | 0.99 | 1 | 1 | 37588 |
| | Avg. | 0.98 | 0.99 | 0.99 | |
| Manual Labeling | Exception ID | 0.89 | 0.69 | 0.78 | 169 |
| | Exception Name | 0.78 | 0.97 | 0.86 | 61 |
| | Avg. | 0.83 | 0.83 | 0.82 | |

Using the machine learning model 110 the analysis dataset may be tagged with various information as shown in example results below. If the model 110 can extract an exception from a query, then the query is considered an exception query. In many cases, search queries can have multiple exceptions IDs or names due to search exception traces from software development tools. In those cases, the root or first level of exception may be considered. In one example, the machine learning model was used to extract 118315 ID-based exception query and 32887 name-based exception queries from 980155 search queries.

Every programming language (PL) can have its own format for exception names and IDs. To perform PL specific exception analysis, search queries may be cataloged into various PLs at categorizer 150 based on the exception, query text and the clicked urls. Three popular programming languages 1) Java, 2) C#, and 3) Python were used for categorization. To categorize search queries into these programming languages, a keyword-based search with keywords (java, c#, and python). The keywords were used in raw queries and also in the clicked Urls. If a match is found the corresponding PL is assigned to the query. For instance, Example 1 below shows such a search query where the PL name was found in the query. If the PL name was not found in the search query or the clicked Urls, the exception tagged in the search query is looked for in exception lists for Java [3], C# [2] and Python [4]. If a match in any of these lists, the corresponding PL name is assigned to that query. For instance, in Example 2, no PL name occurs in the search query or the clicked Urls. However, a cross-reference exception name with the C# exception list was found to be a match. C# is assigned as the PL type for that query. If no keyword-based match or exception list-based match is found, no PL name is assigned for the query. In one example categorization effort, 17035 exception search queries were categorized as Java related, 13452 exception search queries as C# related, and 27723 queries as Python related.

Example 1 Exception search query with PL nameSearch query:
python ImportError: cannot
import name ______ Here keyword python matched in the query. This exception search query was categorized as a Python PL exception.
Example 2 Exception search query with PL not mentioned.
Search query: System.io.
filenotfoundexception addinutil.exe
The PL name was not mentioned in the search query or clicked Url. Cross-referencing a System. io.filenotfoundexception in C# exception list resulted in a match. This exception query was assigned to a C# PL category.

Two examples of search queries, or direct exception output from platform 147, are preprocessed on analysis path 127 that includes feature 1extraction 140 and exception text extractor 145 and provided to model 110. Example outputs are also shown. The query (or platform output) is listed, followed by the corresponding output 155 corresponding to tagged information, including an exception name, the corresponding programming language, and a short list of recommended solutions comprising links to information relevant to the exception for example.

Example 1:

Query: traceback (most recent call last): file train.py, line 1, in <module> import tensorflow as tf importerror: no module named 'tensorflow'

Output:

Exception Name: importerror

Programming Language: Python

Recommended Solutions:

https://github.com/tensorflow/tensorflow/issues/5478 https://stackoverflow.com/questions/42244198/importerror-no-module-named-tensorflow Example 2:

Query: exception in thread "main" java.lang.arrayindexoutofboundsexception: index 5 out of bounds for length 5 at com.scheduler.main(main.java:17)}

Output:

Exception Name: java.lang.arrayindexoutofboundsexception

Programming Language: Java

Recommended Solutions:

https://stackoverflow.com/questions/17850588/java-lang-arrayindexoutofboundsexception-2-0 https://javarevisited.blogspot.com/2014/05/exception-in-thread-main-arrayindexoutofboundsexception-java.html#axzz60P7hGOr0

In one embodiment, a developer may be writing an application in the Visual Studio programming language comprising platform 147. Upon compiling the application, the output may include one or more exceptions. The output may be provided for feature extraction 140, exception text extractor 145, and model 110. The output 155 may point to the best place to find information to resolve the exception or error. In one embodiment, the system 110 may be accessed directly by the development tool to provide the compiler output, with feature extraction and exception text extraction used to preprocess the compiler output that is then provided to the model 110.

Figure 2:
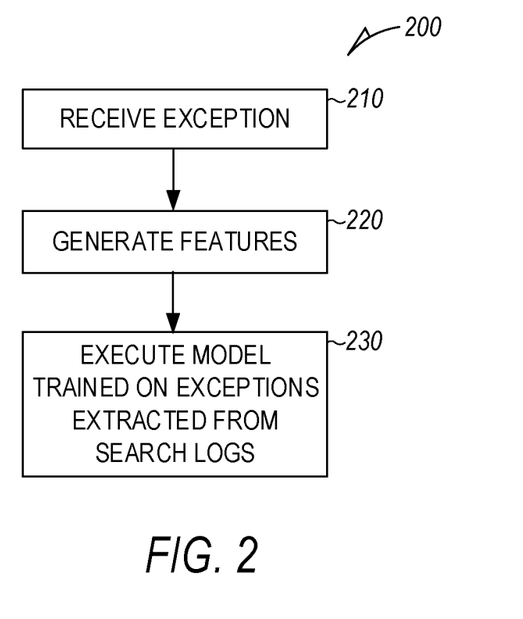
FIG. 2 is a flowchart illustrating a computer implemented method of enhancing web-based searching for exception analysis in order to debug problems with programming code that resulted in the exception according to an example embodiment.

FIG. 2 is a flowchart illustrating a computer implemented method 200 of enhancing web-based searching for exception analysis in order to debug problems with programming code that resulted in the exception. Method 200 begins by receiving at operation 210 an exception generated based on programming code. At operation 220 exception features are generated from the received exception. The generated exception features may be generated by selecting the features based on a set exception features derived from exception search logs, such as web search logs that contain at least some search sessions regarding exceptions. The exception features may include tokens and parts of speech (POS) tags, and may also include contextual features, gazetteer features, and orthographic features. A machine learning model is executed at operation 230 on the received exception and generated exception features to provide information from the search logs identified as most helpful to resolve the received exception, wherein the machine learning model was trained on training data comprising extracted exceptions and the set of exception features derived from the exception search logs.

The training data is labeled by performing regular expression-based labeling to generated labels for the extracted exceptions. The regular expression based labeling may include removing noise from the regular expression-based labels. The labels may be differentiated between exception names and exception IDs.

Figure 3:
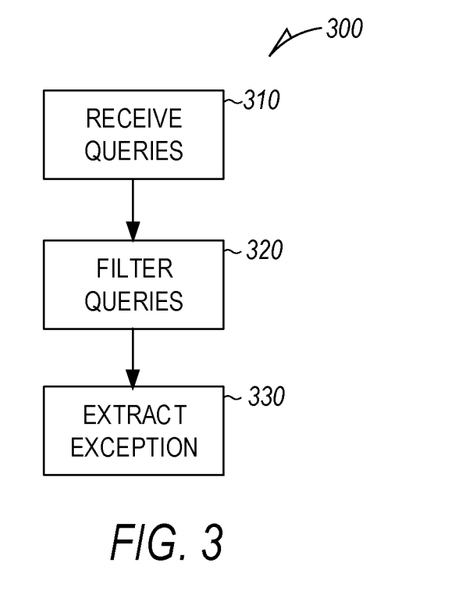
FIG. 3 is a flowchart illustrating a computer implemented method of processing a search log for queries related to exceptions according to an example embodiment.

FIG. 3 is a flowchart illustrating a computer implemented method 300 of processing a search log for queries related to exceptions. In one embodiment, receiving an exception based on programming code at operation 210 (FIG. 2) includes receiving multiple search requests at operation 310 from a web search log of a general-purpose search engine. The multiple search requests are filtered at operation 320 to identify a search request having an actual programming exception as a subject of the search request. The exception may be extracted from the search request at operation 330 via name entity recognition. Name entity recognition is performed using a first-order Markov linear chain. The first-order Markov linear chain may include a forward/backward algorithm using a scaling method.

In a further embodiment, receiving an exception based on programming code at operation 210 includes receiving a query from a developer based on an exception generated by compiling the programming code.

Figure 4:
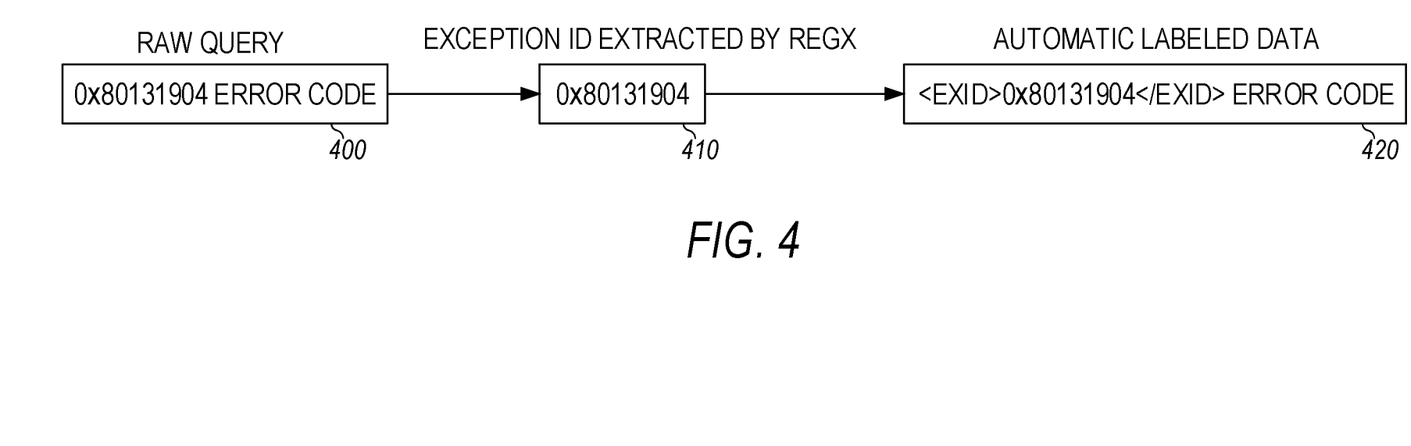
FIG. 4 is a block flow diagram illustrating data labeling according to an example embodiment.

FIG. 4 is a block flow diagram illustrating data labeling according to an example embodiment. A raw query is illustrated at 400. The raw query 400 has an exception ID that is extracted using regular expression as shown at 410: "0x80131904." Automatic labeling occurs as shown at 420 "<exid>0x80131904</exid> error code." In one embodiment, words in the queries are converted to lowercase for normalization. Features may be found including one or more of a prefix or suffix of a word, words surrounding the word, such as the previous or next word, whether the word is uppercase or lowercase, whether the word is a number or contains digits, the POS (part of speech) tag of the word and those of surrounding words, and whether the word contains a special character or characters such as a hyphen, dollar sign, etc.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

Figure 5:
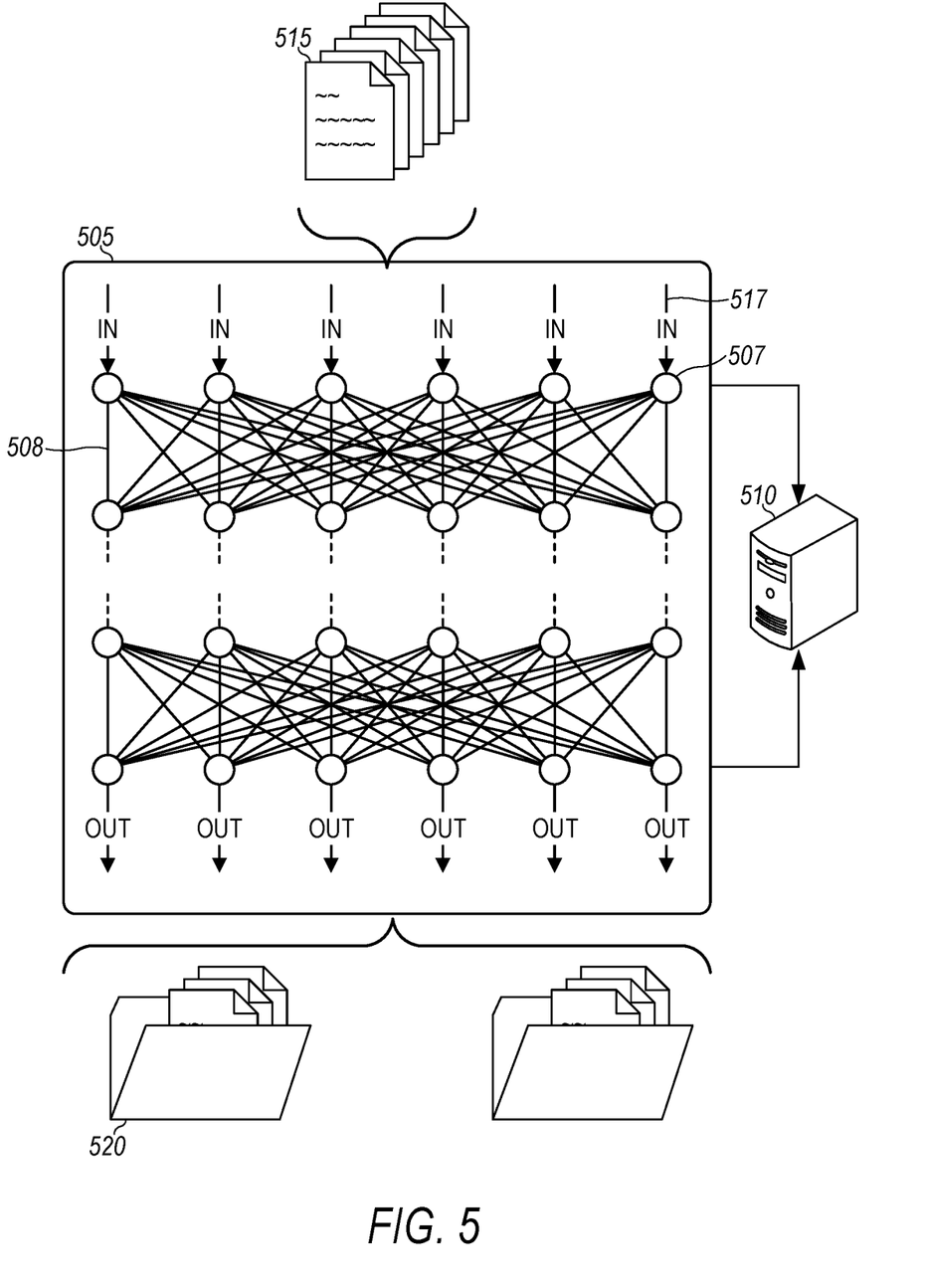
FIG. 5 is a block diagram of an example of an environment including a system for neural network training, according to an embodiment according to an example embodiment.

FIG. 5 is a block diagram of an example of an environment including a system for neural network training, according to an embodiment. The system includes an ANN 505 that is trained using a processing node 510. ANN 506 corresponds to model 110 from FIG. 1 and may be a CRF based model in some embodiments. The processing node 510 may be a CPU, GPU, field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as red, green, and blue pixel values and intensity values for an image or pitch and volume values at discrete times for speech recognition. Each value of the training or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Based on the exceptions and PL tagging of search queries, an empirical analysis may be performed on exception search behavior. Output 155 may be used to analyze at least five aspects: 1) Popularity Analysis, 2) Effort Analysis, 3) Success Analysis, 4) Exception Query Characteristics and 5) Website analysis for debugging of exceptions.

Analysis performed on the output 155 provided by system 100 indicates that some exceptions can be rare, or their search results could not have yielded a meaningful result. To avoid such unusual cases, one may consider exceptions that appear in at least twenty distinct search sessions. Results from such analysis are very useful in tailoring help related services, such as documents describing how to use various programming commands, help information, most frequently asked questions, and other services designed to help developers assess and fix errors in programs. Such analysis can even help developers assess how much effort may be required to address and fix exceptions.

To find frequently searched exceptions, unique session count can be used as a metric as the same exception can be searched for with different text. Exceptions can be presented in two text formats: ID-based exception and Name-based exception. The frequency of both ID-based exceptions and Name-based exceptions may be measured. Among the top ten ID-based exception list, six of the exceptions were found to be Http protocol exceptions and rest were Windows OS related exceptions.

In Name-based exceptions, "typeerror" is the most searched exception. A reason might be due to the fact that both Python and JavaScript throw typeerror exceptions. Other popular Name-based exceptions are also related to Python and Java.

Of the top searched exceptions of Java, C#, and Python. For Java, "noclassdeffounderror" was the most popular exception. Exception 65542 which is thrown from the Java utility library for use with OpenGL. For C#, "invalidoperationexception" is the most frequently searched exception. Even though cs1061 and cs0029 both are C# compile time exceptions, they are also frequently searched. Also, the C# exception "ad0001" that is thrown from code analyzer also shows up in the top searched for exceptions. For Python, type-error was the mostly searched exception, which is raised when an operation or function is applied to an object of inappropriate type. Others frequent exceptions are also from Python built-in exceptions. Python's "typeerror" exception is searched 4.64 times more frequently than Java's most frequent exception and 8.47 times more frequently than C#'s top searched exception. This also indicates that Python exceptions are more frequently searched than Java and C#.

Most popular ID-based exceptions are related to HTTP Connection and OS related errors. Python exceptions are more frequently searched than Java and C# exceptions.

For effort analysis, Total Dwell Time in seconds may be used as an evaluation metric. Dwell Time in a Url is limited to 600 seconds to avoid the case where the user clicked the Url but remained inactive over 600 seconds. Exception search effort analysis is divided both by exception format (ID/Name) as well as programming language. Overall, exception searches take an average effort of 157.39 sec. While for ID-based exceptions it takes 155.22 secs, Name-based exceptions takes 164.57 secs of effort, which is 6.02% higher than ID-based exception search. Name-based exceptions are more effort-intensive than ID-based exception. This could be due to the fact that IDs are usually unique are more easily "searchable" due to easy matching. For programming language specific effort analysis, Java and C# take a mean effort time of 160.59 sec and 161.57 sec respectively. While Python exception searches takes 169.18 sec, which is 5.34% higher than Java and 4.71% than C#. Python exceptions are most effort-intensive exceptions(confirmed by t-test with p-value(Java,Python)=0.002 and p-value(C#,Python)=0.03, which are lower than threshold 0.05). Java and C# exceptions take similar effort for search which we confirmed by t-test with p-value(Java,C#)=0.79.

Search success can be defined as user found information for a query that the user entered. To evaluate exception search success behavior, the Search Success metric may be used. The value for this metric is either 0 for fail and 1 for success. An example exception search success analysis was performed over the overall dataset of exceptions, format-based exceptions and PL specific exceptions. The overall success rate for exceptions was found to be 0.57, while ID-based exception shows the mean success rate of 0.56 and Name-based exception shows the mean success rate of 0.58. ID-based exceptions are less successful than Name-based exception in terms of finding a solution from search engines. In terms of PL specific analysis, Python exceptions are the most successful in terms of finding a solution from the search engines with mean success rate 0.61. Among the three programming languages, C# shows least success rate which 0.54. Mean success rate of these three programming languages are also statistically significant with t-test p-Value (Java,C#)=2.05e−31, p-Value(Java,Python)=0.01, and p-Value(C#,Python)=1.35e−98.

The least successful exceptions of Java, C#, and Python were also found. "verifyerror" is the least successful exception among Java exceptions. "java.lang.VerifyError" can occur when the compile-time and run-time environments are different. Another less successful exception of Java is "saxparseexception", which might be caused during XML parsing and the solution also depends on XML content. For C#, top four least successful exceptions are due to code analysis (ad0001) and compile-time exceptions (cs1061, cs0266, and cs1003). This might be an indication that the C# development environment finds a lot more exceptions during code analysis and compile-time than before the run-time executions, which is good from a deployment perspective. For Python, "connectionerror" is the least successful exception and it is also an exception that depends on the connection environment rather than on the code alone.

ID based exceptions are less successful than Name-based exceptions. Also, among the three Programming Languages C# has the lowest search success.

The popular web domains for finding solutions to exceptions were found using the metric: click count to a certain web domain for analysis and ranking of its helpfulness in finding solutions to exceptions. "stackoverflow.com" is the topmost web domain to provide a solution or help with exceptions. The next popular web domain is from Microsoft community help site answers.microsoft.com site which covers troubleshooting help for a wide range of Microsoft products. Github is the fourth most popular web domain for helping find solutions to exceptions.

The above findings point to the need for future programming language documentation to be unified and cross-referenced in order to help find exception information more efficiently. ID-based exceptions take less effort to find a solution than name-based exceptions. This is because a GPSE is able to pick up the unique IDs more successfully in search queries. Based on the information derived from use of system 100, future system designers should consider adding a unique ID to exceptions in order to make exceptions more "searchable".

The identified most frequently searched exceptions, most effort-intensive, and less successful exceptions information helps identify and motivate the importance of improving the documentation support for exceptions. Developer websites like StackOverflow and GitHub can also leverage the methodology and metrics provided by system 100 for improving developer experience. Adding the functionality of system 100 to IDE's can provide better suggestions for fixing exceptions in the development environment. Whether such functionality is provided via calls to system 100, or directly integrating the functions performed by system 100 into the IDEs, the functionality may provide such benefits. Forums may provide enhanced exception documentation or solution suggestions for most frequent, most search effort-intensive, or less successful exceptions can reduce developer effort as identified by system 100.

Figure 6:
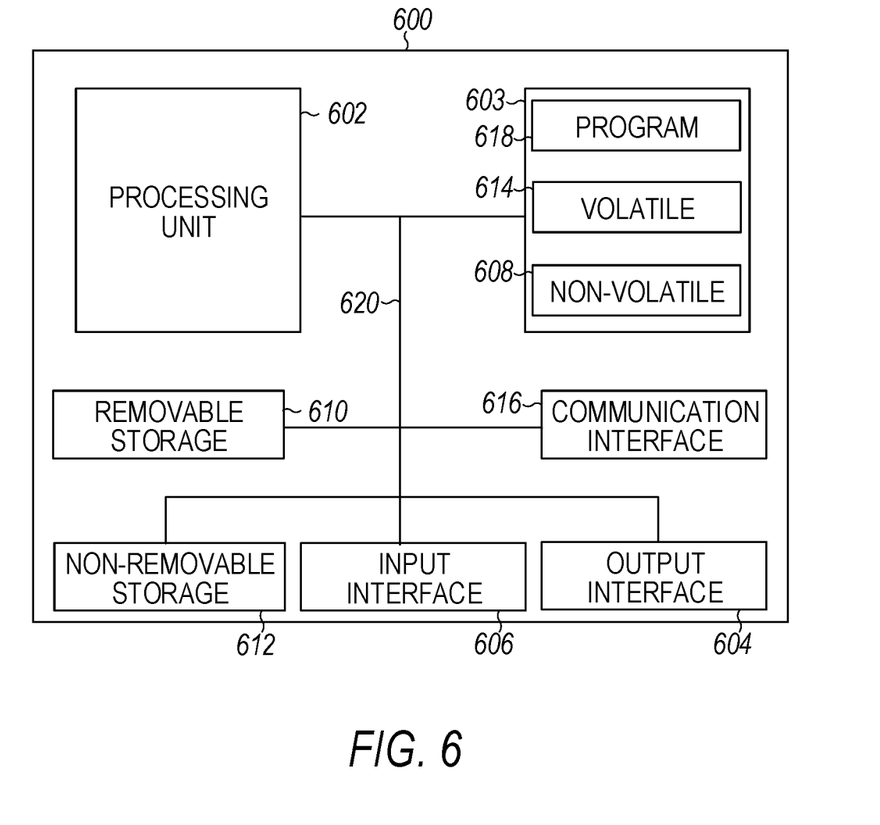
FIG. 6 is a block schematic diagram of a computer system to implement one or more example embodiments.

FIG. 6 is a block schematic diagram of a computer system 600 to perform the methods and algorithms for training the model and using the model according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more of the methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes receiving an exception generated based on programming code, generating exception features from the received exception, the generated exception features being generated based on a set exception features derived from search logs, and executing a machine learning model on the received exception and generated exception features to provide information from the search logs identified as most helpful to resolve the received exception, wherein the machine learning model was trained on training data comprising extracted exceptions and the set of exception features derived from the search logs.

2. The method of example 1 wherein the exception features include tokens and parts of speech (POS) tags.

3. The method of example 2 wherein further exception features include contextual features, gazetteer features, and orthographic features.

4. The method of any of examples 1-3 wherein the training data is labeled by performing regular expression-based labeling to generate regular expression-based labels for the extracted exceptions.

5. The method of example 4 wherein the regular expression based labeling includes removing noise from the regular expression-based labels.

6. The method of any of examples 4-5 wherein the regular expression-based labels are differentiated between exception names and exception IDs.

7. The method of any of examples 1-6 wherein receiving an exception includes receiving multiple search requests from a web search log of a general-purpose search engine and filtering the multiple search requests to identify one or more search requests having an exception as a subject of each identified search request.

8. The method of example 7 wherein receiving an exception further comprises extracting the exception from the search requests via name entity recognition.

9. The method of example 8 wherein name entity recognition is performed using a first-order Markov linear chain.

10. The method of example 9 wherein the first-order Markov linear chain comprises a forward/backward algorithm using a scaling method.

11. The method of any of examples 7-10 wherein the generated features comprise tokens and parts of speech.

12. The method of any of examples 1-11 wherein receiving an exception generated based on programming code comprises receiving a query from a developer based on an exception generated by compiling the programming code.

13. The method of any of examples 1-12 wherein receiving an exception generated based on programming code comprises receiving the exception directly from a development tool that generated the exception.

14. A machine-readable storage device having instructions for execution by a processor of a machine to cause the processor to perform operations to perform a method. The operations include receiving an exception generated based on programming code, generating exception features from the received exception, the generated exception features being generated based on a set exception features derived from search logs, and executing a machine learning model on the received exception and generated exception features to provide information from the search logs identified as most helpful to resolve the received exception, wherein the machine learning model was trained on training data comprising extracted exceptions and the set of exception features derived from the search logs.

15. The device of example 14 wherein the training data is labeled by performing regular expression-based labeling to generated labels for the extracted exceptions and removing noise from the regular expression-based labels, wherein the labels are differentiated between exception names and exception IDs.

16. The device of any of examples 14-15 wherein receiving an exception includes receiving multiple search requests from a web search log of a general-purpose search engine and filtering the multiple search requests to identify one or more search requests having an exception as a subject of each identified search request.

17. The device of example 16 wherein receiving an exception further comprises extracting the exception from the search requests via name entity recognition and wherein name entity recognition is performed using a first-order Markov linear chain.

18. The device of any of examples 14-17 wherein receiving an exception generated based on programming code comprises receiving a query from a developer based on an exception generated by compiling the programming code or receiving the exception directly from a development tool that generated the exception.

19. A device includes a processor and a memory device coupled to the processor and having a program stored thereon for execution by the processor to perform operations. The operations include receiving an exception generated based on programming code, generating exception features from the received exception, the generated exception features being generated based on a set exception features derived from search logs, and executing a machine learning model on the received exception and generated exception features to provide information from the search logs identified as most helpful to resolve the received exception, wherein the machine learning model was trained on training data comprising extracted exceptions and the set of exception features derived from the search logs.

20. The device of example 19 wherein receiving an exception includes receiving multiple search requests from a web search log of a general-purpose search engine and filtering the multiple search requests to identify one or more search requests having an exception as a subject of the search request.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method comprising:
receiving an exception generated based on programming code;
generating exception features from the received exception, the generated exception features being generated based on a set of exception features derived from search logs; and
executing a machine learning model on the received exception and generated exception features to provide information from the search logs identified as most helpful to resolve the received exception, wherein the machine learning model was trained on training data comprising extracted exceptions and the set of exception features derived from the search logs, wherein the training data is labeled by performing regular expression-based labeling to generated labels for the extracted exceptions, and wherein the labels are differentiated between exception names and exception IDs.

2. The method of claim 1 wherein the exception features comprise tokens and parts of speech (POS) tags.

3. The method of claim 2 wherein further exception features comprise contextual features, gazetteer features, and orthographic features.

4. The method of claim 1, wherein the regular expression based labeling includes removing noise from the regular expression-based labels.

5. The method of claim 1 wherein receiving an exception comprises:
receiving multiple search requests from a web search log of a general-purpose search engine; and
filtering the multiple search requests to identify one or more search requests having an exception as a subject of each identified search request.

6. The method of claim 5 wherein receiving an exception further comprises extracting the exception from the search requests via name entity recognition.

7. The method of claim 6 wherein name entity recognition is performed using a first-order Markov linear chain.

8. The method of claim 7 wherein the first-order Markov linear chain comprises a forward/backward algorithm using a scaling method.

9. The method of claim 5 wherein the generated features comprise tokens and parts of speech.

10. The method of claim 1 wherein receiving an exception generated based on programming code comprises receiving a query from a developer based on an exception generated by compiling the programming code.

11. The method of claim 1 wherein receiving an exception generated based on programming code comprises receiving the exception directly from a development tool that generated the exception.

12. A machine-readable storage device having instructions for execution by a processor of a machine to cause the processor to perform operations to perform a method, the operations comprising:
receiving an exception generated based on programming code;
generating exception features from the received exception, the generated exception features being generated based on a set of exception features derived from search logs; and
executing a machine learning model on the received exception and generated exception features to provide information from the search logs identified as most helpful to resolve the received exception, wherein the machine learning model was trained on training data comprising extracted exceptions and the set of exception features derived from the search logs, wherein the training data is labeled by performing regular expression-based labeling to generated labels for the extracted exceptions, and wherein the labels are differentiated between exception names and exception IDs.

13. The device of claim 12 wherein the training data is labeled by further.

14. The device of claim 12 wherein receiving an exception comprises:
receiving multiple search requests from a web search log of a general-purpose search engine; and
filtering the multiple search requests to identify one or more search requests having an exception as a subject of each identified search request.

15. The device of claim 14 wherein receiving an exception further comprises extracting the exception from the search requests via name entity recognition and wherein name entity recognition is performed using a first-order Markov linear chain.

16. The device of claim 12 wherein receiving an exception generated based on programming code comprises receiving a query from a developer based on an exception generated by compiling the programming code or receiving the exception directly from a development tool that generated the exception.

17. A device comprising:
a processor; and
a memory device coupled to the processor and having a program stored thereon for execution by the processor to perform operations comprising:
- receiving an exception generated based on programming code;
- generating exception features from the received exception, the generated exception features being generated based on a set of exception features derived from search logs; and
- executing a machine learning model on the received exception and generated exception features to provide information from the search logs identified as most helpful to resolve the received exception, wherein the machine learning model was trained on training data comprising extracted exceptions and the set of exception features derived from the search logs, wherein the training data is labeled by performing regular expression-based labeling to generated labels for the extracted exceptions, and wherein the labels are differentiated between exception names and exception IDs.

18. The device of claim 17 wherein receiving an exception comprises:
- receiving multiple search requests from a web search log of a general-purpose search engine; and
- filtering the multiple search requests to identify one or more search requests having an exception as a subject of the search request.

* * * * *